United States Patent [19]

Brown

[11] Patent Number: 4,572,584
[45] Date of Patent: Feb. 25, 1986

[54] PLASTIC WHEEL COVER RETENTION ARRANGEMENT

[75] Inventor: Trevor J. Brown, Rochester, Mich.

[73] Assignee: General Motors Corporation, Detroit, Mich.

[21] Appl. No.: 274,750

[22] Filed: Jun. 23, 1981

[51] Int. Cl.$^4$ ............................................. B60B 7/00
[52] U.S. Cl. ............................. 301/37 TP; 301/37 R; 301/37 P
[58] Field of Search ............... 301/37 R, 37 P, 37 TP, 301/37 PB, 37 C, 37 CD, 108 A; 220/307; 222/182

[56] References Cited

U.S. PATENT DOCUMENTS

| | | | |
|---|---|---|---|
| 2,884,160 | 4/1959 | Abpanalp | 301/108 A |
| 2,902,316 | 9/1959 | Black | 301/37 P |
| 3,883,181 | 5/1975 | Dissinger | 301/37 P |
| 3,894,775 | 7/1975 | Christoph et al. | 301/37 TP |
| 4,003,604 | 1/1977 | Connell | 301/37 CD |
| 4,004,837 | 1/1977 | Main | 301/37 P |
| 4,012,078 | 3/1977 | Meyers | 301/37 TP |
| 4,054,323 | 10/1977 | Lewis | 301/37 R |
| 4,186,853 | 2/1980 | White | 222/182 |
| 4,229,047 | 10/1980 | Beisch | 301/37 P |
| 4,520,943 | 6/1985 | Nielsen | 220/307 X |

Primary Examiner—Robert B. Reeves
Assistant Examiner—Russell D. Stormer
Attorney, Agent, or Firm—Herbert Furman

[57] ABSTRACT

A cast vehicle wheel includes a series of circumferentially spaced radially extending reinforcement ribs. A number of adjacent pairs of ribs are provided with ramps which slope axially and radially opposite to each other, with one such ramp including a retention notch. The cover includes a number of radially flexible box members including a base wall slidably engageable with one of the ramps and a retention lip slidably engageable with the other ramp and interlockingly engageable with the retention notch. The box member is twisted until the retention lip slides past the other ramp and into engagement with the retention notch.

3 Claims, 7 Drawing Figures

PLASTIC WHEEL COVER RETENTION ARRANGEMENT

This invention relates to plastic wheel covers and more specifically to a retention arrangement for mounting a plastic wheel cover to a cast vehicle wheel of the type having a series of circumferentially spaced radially extending reinforcement ribs.

BACKGROUND OF THE INVENTION

Increased emphasis on weight savings has led to a wider use of plastic for wheel covers.

Prior art retainers are not well suited for the retention of wheel covers to cast wheels of the type having a series of circumferentially spaced radially extending reinforcement ribs. Such retainers include metal clips secured to the periphery of the wheel cover for engaging the peripheral flange of a conventional wheel such as shown in Beisch U.S. Pat. No. 4,229,047. Cast rib wheels lack such a peripheral flange. Meyers U.S. Pat. No. 4,012,078 and Main U.S. Pat. No. 4,004,837 show the use of resilient plastic fingers which snap fit within annular recesses in the wheel hub. Since cast rib wheels do not have a hub adaptable to the use of such fingers and since this type of retention requires the use of plastic materials with above average creep and thermal properties, this type of retainer is also not well suited for use with cast rib wheels. Dessinger, U.S. Pat. No. 3,883,881 shows integral plastic retainers which include a circumferentially extending peripheral flange which snaps into a matching flange on the wheel cover. Again this type of retainer is not well adaptable for use with cast ribbed wheels.

SUMMARY OF THE INVENTION

This invention provides a retention arrangement which includes a number of retainers molded integrally with the plastic wheel cover and cooperable with the radially extending reinforcement ribs of the wheel to retain the cover to the wheel. In the preferred embodiment, the retainers include a number of circumferentially spaced radially flexible box members molded integrally with the wheel cover and extending axially inwardly from the inner side of the cover. Each box member opens radially inwardly and includes axially inwardly extending base and side walls interconnected by a radially inwardly extending flange which extends perpendicular to the side and base walls and terminates in a retention lip. Certain adjacent pairs of the radial ribs of the wheel, equal in number to the box members, include walls or ramps which slope axially and radially opposite to each other, with one such ramp including a retention notch at its furthest axial inward extent The cover further includes a series of slotted locators located at a radius greater than that of the box members or ramps so as to be received only over another rib of the wheel located at a radius similar to that of the locators.

When the wheel cover is initially moved axially inwardly into the wheel, the locators and ribs register each box member circumferentially and axially with a pair of the oppositely sloped ramps. As the wheel cover is moved axially further into the wheel, the base walls of the box members and the retention lips slidably engage a respective one of the pairs of oppositely sloping ramps to radially twist the box member. This twisting continues until the retention lip snaps into the retention notch, whereupon the box member substantially untwists with the base wall thereof remaining in engagement with a respective ramp under a slight tension. This serves to both retain and derattle the wheel cover and wheel. The cover further includes a peripheral rib which seats on all of the ribs of the wheel to axially tension the cover and ensure axial engagement of the retention lips with the retention notches. Since the box members remain only under a slight tension and slight radial twist, the cover can be made from a plastic having average creep and thermal properties.

BRIEF DESCRIPTION OF THE DRAWINGS

These and other features of the invention will be apparent from the following description and drawings wherein.

DESCRIPTION OF THE PREFERRED EMBODIMENT

Figure 1:
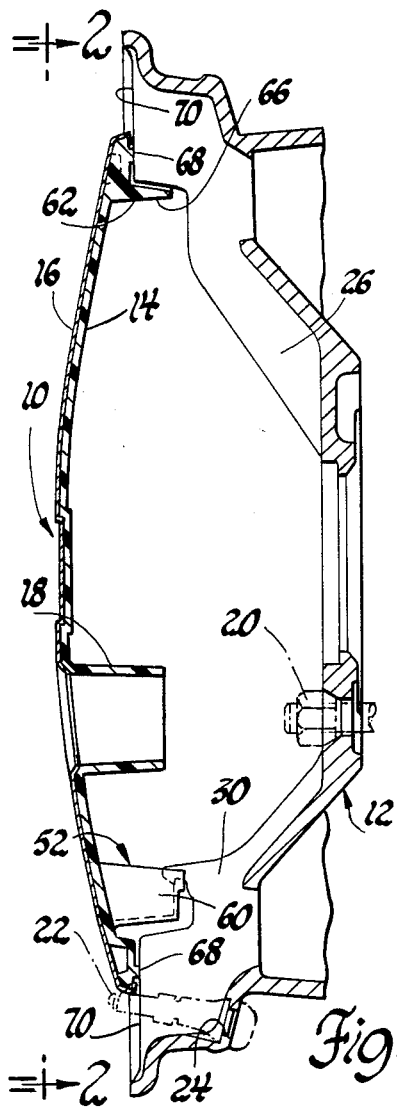
FIG. 1 is a cross-sectional view of a vehicle wheel having a wheel cover retained thereon by a retention arrangement according to this invention.
Figure 3:
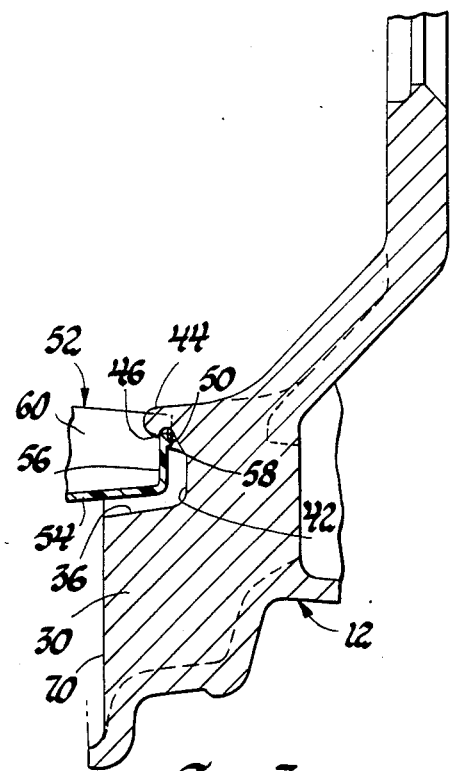
FIG. 3 is an enlarged partial sectional view taken along line 3—3 of FIG. 2.
Figure 2:
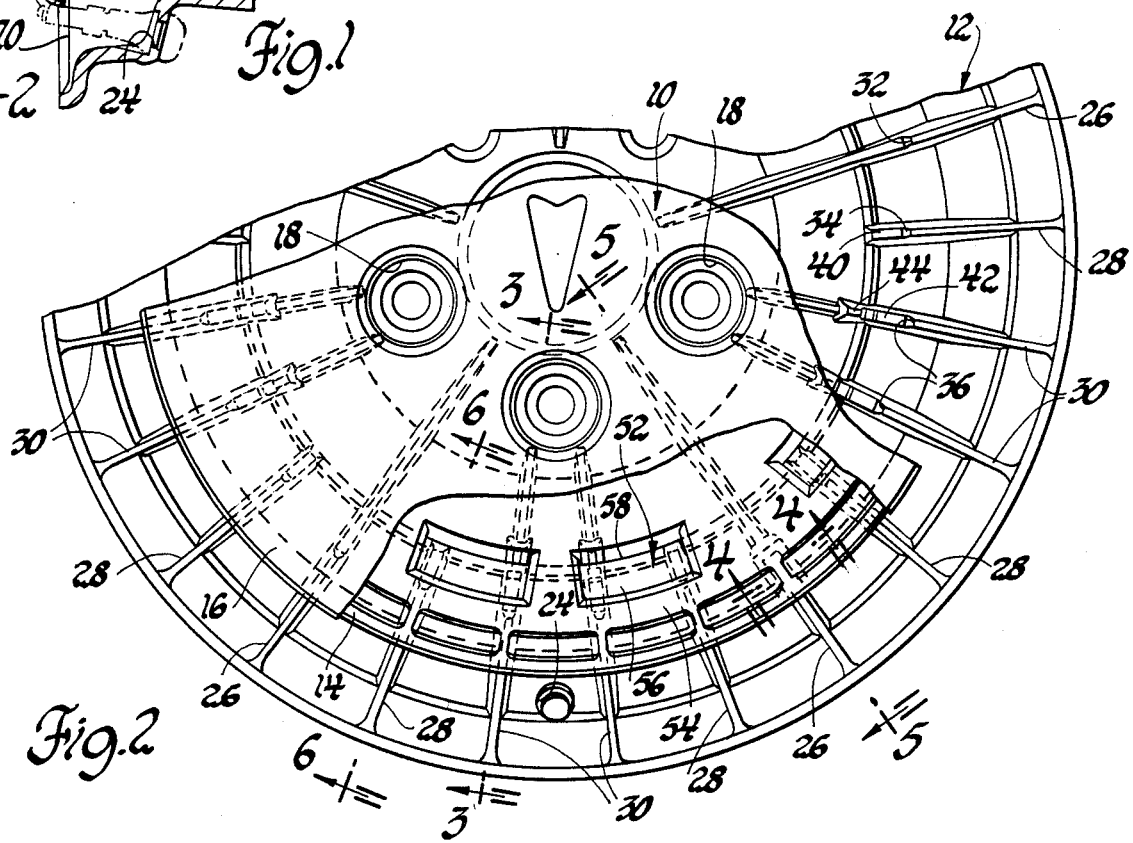
FIG. 2 is an enlarged broken away partial view taken along line 2—2 of FIG. 1.

Referring to FIGS. 1 and 2, a plastic wheel cover designated generally 10 is shown attached to a cast alloy type wheel designated 12. The wheel cover 10 includes a body 14 of molded plastic material having average creep properties. A covering skin 16 of aluminum, bright Mylar or similar material is clinched over the peripheral edge or body 14. Five equiangularly spaced integral cylindrical extensions 18 give access to lug nuts 20 of wheel 12 without removal of the wheel cover. Covering skin 16 is apertured and embossed inwardly at each extension 18. A tire valve stem 22 projects through an opening 24 in wheel 12.

Figure 5:
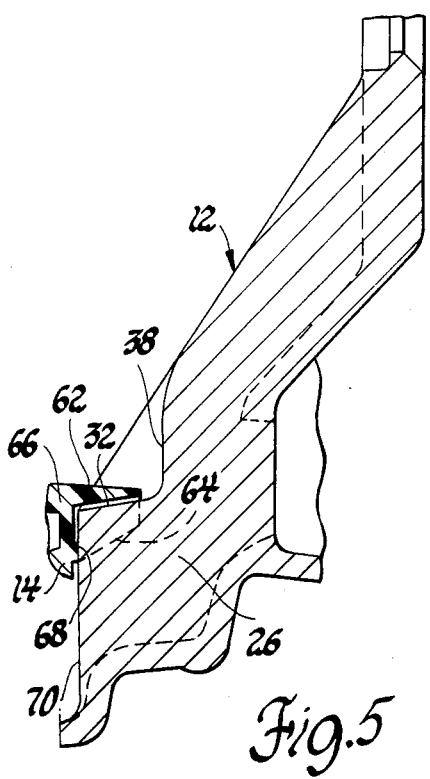
FIG. 5 is an enlarged sectional view taken along line 5—5, of FIG. 2.
Figure 6:
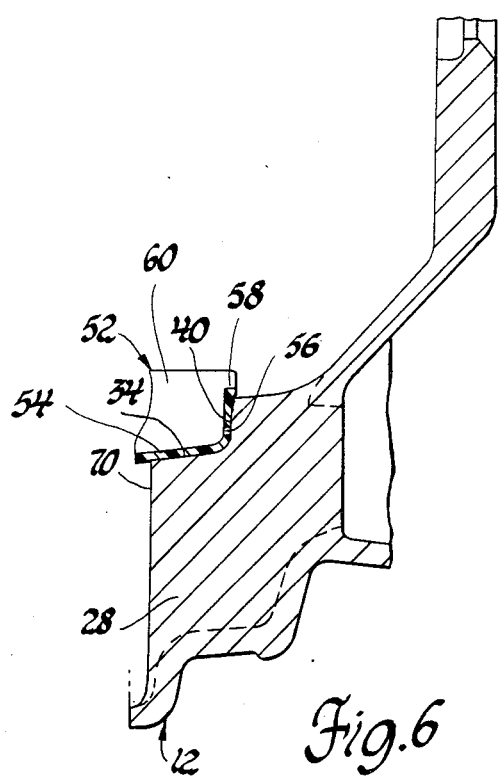
FIG. 6 is an enlarged sectional view taken along line 6—6 of FIG. 2.
Figure 7:
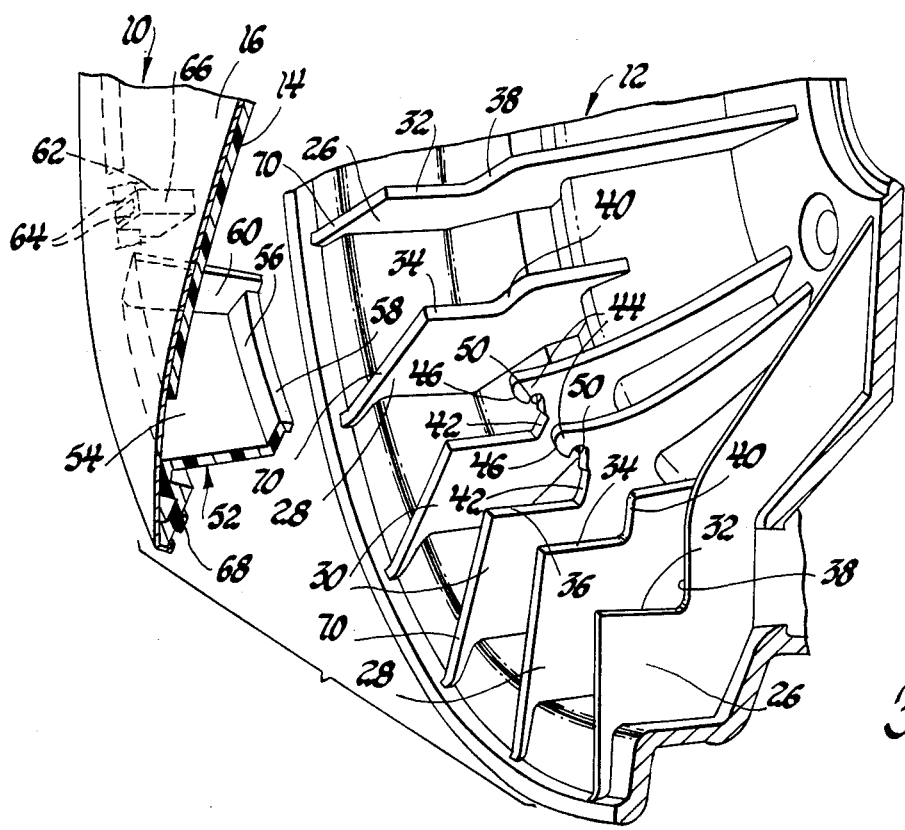
FIG. 7 is a partial exploded perspective view of the wheel and wheel cover.

Referring now to FIGS. 2 through 7, wheel 12 includes a series of radially extending circumferentially spaced reinforcement buttresses or ribs designated 26, 28 and 30. There are 25 such buttresses or ribs on wheel 12, including five equiangularly spaced ribs 26; ten equiangularly spaced ribs 28, one located on each side of each rib 26; and ten equiangularly spaced ribs 30 located in pairs between and respective to each pair of ribs 28 between each pair of ribs 26. The rib pattern shown in FIG. 7 is repeated over the circumference of wheel 12. Each rib 26, 28 and 30 includes an axially facing radially extending wall 32, 34 and 36 respectively. Walls 32, 34 and 36 slope radially and axially of the wheel 12, FIGS. 5, 6 and 3 respectively. Walls 32 and 36 need not be sloped if desired. Walls 34 are offset radially inwardly from walls 32 and walls 36, and walls 36 are offset radially inwardly from walls 32, FIG. 2. Walls 32 thus have the greatest radial spacing from the axis of the wheel. The relative radial relationship between walls 32, 34 and 36 is important as will be apparent from a further description. Walls 32, 34 and 36 merge into radially extending walls 38, 40 and 42 respectively which generally lie in a common axial plane designated about the axis of the wheel.

An integral rounded projection 44 extends axially of each wall 42 and includes thereon a wall 46 which slopes radially and axially of the wheel and oppositely to the walls 34. Each wall 34 provides a first ramp or sloped surface which is respective to a second ramp or sloped surface provided by an adjacent wall 46. Each wall 46 at its furthest radial extent merges into a radially outwardly opening retention notch or groove 50, FIG. 3. As shown in FIGS. 2 and 7, molded integral with the cover body 14 are a plurality of flexible box members 52 which extend axially inwardly from the underside of the cover body. There are ten such box members circumferentially spaced around the underside of cover body 14. As will be apparent from a further description, each box member is respective to an adjacent pair of ribs 28 and 30 as shown in FIG. 2 and cooperates with such ribs to retain the wheel cover 10 to the wheel. As best shown in FIG. 7, each box member 52 includes a radially outer base wall 54 integral with the cover body 14 and sloping axially and radially of the wheel cover. Wall 54 merges at its axial inner end with an end wall or flange 56 which is generally perpendicular thereto and extends radially inwardly of the wheel cover. Flange 56 terminates in a retention lip 58 at its radially inner end. A pair of integral side walls 60 join wall 54, flange 56 and lip 58 and add strength to box member 52. The radially outer surfaces of walls 54 are spaced at a slightly greater radius from the wheel axis than the walls 34. Lips 58 are formed at a radius from the wheel axis which is slightly less than the least radius of walls 46 and generally equal to the greatest radial spacing of grooves 50.

Figure 4:
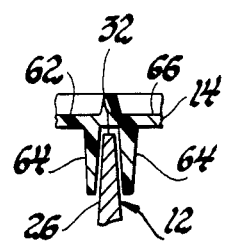
FIG. 4 is a sectional view taken along line 4—4 of FIG. 2.

Also integrally molded to the underside of cover body 14 are a plurality of slotted locators 62, each of which includes two spaced side walls 64, FIGS. 4 and 7, and a radially and axially sloping wall 66 spaced at a slightly lesser radius from the wheel axis than walls 32 on ribs 26. There are five locators 62, each respective to a rib 26 and an adjacent successive pair of box members 52. Since walls 32 are located at the greatest radial distance from the wheel axis, the slotted locators 62 will only slide over their respective ribs 26 and walls 32 when wheel cover 10 is properly positioned relative to wheel 12 to thereby ensure circumferential registry between each box member 52 and a pair of adjacent respective ribs 28 and 30. FIGS. 4 and 5 show the manner in which a locator 62 straddles a respective rib 26.

To assemble wheel cover 10 to wheel 12, wheel cover 10 is first circumferentially positioned with the locators 62, each partially straddling a respective rib 26. Wheel cover 10 is then pushed axially inwardly of wheel 12 to slidably engage each wall 54 of a box member 52 with a first ramp surface provided by wall 34 and slidably engage the lip 58 of such box member with the axially outer portion of a respective second ramp surface provided by an adjacent wall 46. As wheel cover 10 is then further moved axially inwardly of the wheel 12, the oppositely sloped pairs of first and second ramp surfaces twist each respective box member 52 radially of the cover 10 as the wall 54 of such box member is moved slightly radially inwardly as it slides relative to a wall 34 and the lip 58 of such box member is increasingly moved radially outwardly as it slides relative to a wall 46. This twisting continues until lips 58 move past walls 46 and snap into notches 50 to allow the box members 52 to substantially untwist. The walls 54 remain in engagement with the walls 34 to keep the box members 52 under a slight radial twist. As best shown in FIGS. 5, 6 and 7, the wheel cover 10 includes an axially extending circumferential rib 68 which seats on the axially facing radially extending walls 70 of ribs 26, 28 and 30 concurrently with movement of the lips 58 into the notches 50 to thereby slightly tension the wheel cover 10 axially thereof when installed on the wheel to prevent any relative movement and possible consequent noise. The walls 70 lie in a common radial plane.

Thus this invention provides a plastic wheel cover with integral retention for releasably retaining the cover on a cast alloy type vehicle wheel.

The embodiments of the invention in which an exclusive property or privilege is claimed are defined as follows:

1. A wheel cover retention arrangement for retaining a plastic wheel cover to a wheel, comprising,
    first and second axially and radially extending ramps on the wheel circumferentially spaced about the wheel and being sloped oppositely of one another,
    the second ramp terminating in a radially extending cover retention means,
    an axially extending radially flexible member on the wheel cover including an axially extending wall portion and a retention portion cooperatively interlockable with the retention means to retain the cover to the wheel, the wall portion and first ramp being generally equally radially spaced from the wheel axis and the retention portion and second ramp being generally differentially radially spaced from the wheel axis,
    means locating the wall portion and retention portion in registry with their respective ramps,
    axial movement of the cover relative to the wheel slidably engaging the wall portion with the first ramp and the retention portion with the second ramp, the differential radial spacing of the wall portion and retention portions relative to the ramps acting to radially twist the flexible member relative to the cover, the retention portion moving past the axial limit of the second ramp and to cooperatively interlock with the retention means and allow the flexible member to substantially untwist.

2. A wheel cover retention arrangement for retaining a plastic wheel cover to a vehicle wheel, comprising,
    first and second axially and radially extending ramps on the wheel spaced circumferentially of the wheel and being sloped oppositely to one another,
    the second ramp being located at a lesser radius from the wheel axis than the first ramp,
    the second ramp terminating in a radially extending cover retention means,
    an axially extending radially flexible member on the wheel cover including an axially extending wall portion formed at a radius slightly greater than the first ramp and a retention portion formed at a radius which is slightly less than the second ramp and substantially equal to the cover retention means,
    means circumferentially registering the wall portion and retention portion with the first and second ramps respectively,
    axial movement of the cover relative to the wheel bringing the wall portion and first ramp and retention portion and second ramp into sliding engagement, continued sliding engagement as the cover moves axially of the wheel serving to radially twist the wall portion and retention portion with respect to the wheel, the retention portion interlocking with the retention means as the cover moves into final position to retain the cover to the wheel and allowing the flexible member to substantially untwist.

3. A wheel cover retention arrangement for retaining a plastic wheel cover to a vehicle wheel of the type having a series of radially extending circumferentially spaced reinforcing ribs, comprising, first and second ramp surfaces on a pair of respective reinforcing ribs of the wheel, the second ramp surface being at a lesser radius than the first ramp surface, the second ramp surface terminating at its axial limit in a radially extending notch, an axially extending radially flexible member on the wheel cover including an axially extending base wall formed at a radius slightly greater than the first ramp surface and a radially extending flange terminating in a retention lip formed at a slightly lesser radius than the second ramp surface, the cover further including a slotted member located in a radius larger than the first ramp surface and slidably engageable with a wall formed on a reinforcing rib at substantially the same radius to circumferentially register the base wall with the first ramp surface and the retention lip with the second ramp surface, axial movement of the cover relative to the wheel slidably engaging the base wall with the first ramp surface and radially twisting the flexible member relative to the cover as the retention lip slidably engages the second ramp, the retention lip sliding into the retention notch as the cover moves into final position allowing the flexible member to substantially untwist and retain the cover to the wheel.

* * * * *